(12) United States Patent
Livingston et al.

(10) Patent No.: US 10,414,073 B2
(45) Date of Patent: *Sep. 17, 2019

(54) RESIN CONTAINER FOR STEREOLITHOGRAPHY

(71) Applicant: Formlabs, Inc., Somerville, MA (US)

(72) Inventors: Jason Livingston, Somerville, MA (US); Yoav Reches, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,305

(22) Filed: Nov. 13, 2017

(65) Prior Publication Data

US 2018/0222090 A1 Aug. 9, 2018

Related U.S. Application Data

(63) Continuation of application No. 14/734,141, filed on Jun. 9, 2015, now Pat. No. 9,878,470.

(Continued)

(51) Int. Cl.
*B29C 35/08* (2006.01)
*B65D 6/00* (2006.01)
*B65D 47/06* (2006.01)
*B29C 64/135* (2017.01)
*B29C 64/20* (2017.01)

(Continued)

(52) U.S. Cl.
CPC ........ *B29C 35/0888* (2013.01); *B29C 64/135* (2017.08); *B29C 64/20* (2017.08); *B65D 11/20* (2013.01); *B65D 47/06* (2013.01); *B29C 31/02* (2013.01); *B29C 2035/0833* (2013.01); *B33Y 10/00* (2014.12); *B33Y 30/00* (2014.12)

(58) Field of Classification Search
CPC ... B29C 35/0888; B29C 64/20; B29C 64/135; B29C 31/02; B29C 2035/0833; B65D 11/20; B65D 47/06; B33Y 30/00; B33Y 10/00

See application file for complete search history.

(56) References Cited

U.S. PATENT DOCUMENTS

2014/0085620 A1 3/2014 Lobovsky et al.

FOREIGN PATENT DOCUMENTS

JP 07-060844 A 3/1995
WO WO 2014-016668 A1 1/2014

OTHER PUBLICATIONS

International Search Report and Written Opinion for International Application No. PCT/US2015/035069 dated Sep. 16, 2015.

(Continued)

*Primary Examiner* — Michael C Miggins
(74) *Attorney, Agent, or Firm* — Wolf, Greenfield & Sacks, P.C.

(57) ABSTRACT

According to some aspects, a storage unit for storing a photopolymer resin is provided. The storage unit may comprise a photopolymer resin, a bottom face comprising at least one region of actinically transparent material, the actinically transparent material being actinically transparent with respect to the photopolymer resin, at least one wall extending upwards from said bottom face comprising at least one region of actinically opaque material, the actinically opaque material being actinically opaque with respect to the photopolymer resin, and a lid comprising the actinically opaque material and removably connectable to the at least one wall.

8 Claims, 10 Drawing Sheets

Related U.S. Application Data

(60) Provisional application No. 62/010,228, filed on Jun. 10, 2014.

(51) Int. Cl.
  *B33Y 10/00*   (2015.01)
  *B33Y 30/00*   (2015.01)
  *B29C 31/02*   (2006.01)

(56)     References Cited

OTHER PUBLICATIONS

International Preliminary Report on Patentability for International Application No. PCT/US2015/035069 dated Dec. 22, 2016.

RESIN CONTAINER FOR STEREOLITHOGRAPHY

CROSS REFERENCE TO RELATED APPLICATIONS

This application is a continuation of U.S. patent application Ser. No. 14/734,141, filed Jun. 9, 2015, which claims the benefit under 35 U.S.C. § 119(e) of U.S. Provisional Patent Application No. 62/010,228, filed Jun. 10, 2014, which are hereby incorporated by reference in their entirety.

FIELD OF INVENTION

The present invention relates generally to systems and methods for storing photopolymers used in additive fabrication, e.g., 3-dimensional printing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

Systems and methods for storing photopolymers used in additive fabrication are provided.

According to some aspects, a storage unit is provided comprising a photopolymer resin. The storage unit may have a bottom face comprising at least one region of actinically transparent material that is actinically transparent with respect to the photopolymer resin. The storage unit may also have at least one wall that extends upwards from the bottom face and that comprises at least one region of actinically opaque material that is actinically opaque with respect to the photopolymer resin. Furthermore, the storage unit may have a lid comprising the actinically opaque material and removably connectable to the at least one wall.

According to some aspects, a method of additive fabrication is provided. The method includes producing at least one part from a photopolymer resin via one or more additive fabrication techniques, wherein the photopolymer resin is contained within a container that is a component of an additive fabrication device. The method further includes removing the container from the additive fabrication device and attaching a lid to the container. The lid and container comprise an actinically opaque material and comprise at least one region of actinically transparent material on a bottom face of the container.

The foregoing is a non-limiting summary of the invention, which is defined by the attached claims.

BRIEF DESCRIPTION OF DRAWINGS

The accompanying drawings are not intended to be drawn to scale. For purposes of clarity, not every component may be labeled in every drawing. In the drawings.

DETAILED DESCRIPTION

The present invention relates generally to systems and methods for storing photopolymers used in additive fabrication, e.g., 3-dimensional printing. In particular, the present invention is directed to methods and apparatuses which provide storage of photopolymers suitable for use in additive fabrication during periods in which the photopolymers are not actively being used for additive fabrication. In some embodiments, the methods and apparatuses described herein may provide techniques for storing and transporting materials sensitive to actinic radiation in a format that can be easily loaded, unloaded, and used in material processing. As a result, sensitive materials may be more reliably used in a stereolithography process with reduced user error and increased convenience.

As discussed above, in stereolithography solid objects may be created by successively curing layers of liquid resin via exposure of the resin to actinic radiation. However, actinic radiation capable of causing a liquid resin to partially or completely cure may be present in natural light and/or in other ambient radiation. While during additive fabrication the resin may be shielded from unwanted sources of actinic radiation, unintentional exposure of a resin to actinic radiation may occur while the resin is not being used for additive fabrication. For instance, resin material may be stored in a vessel that is opaque to actinic radiation, yet unintentional exposure to actinic radiation may occur during loading and/or unloading of the resin material to and/or from the vessel. Such unintentional exposure may cause premature curing and/or other undesirable changes to properties of the resin. In addition, during transfer of the resin from one vessel to another some resin may adhere to the vessel and/or the device's container. This resin may be partially or complete cured by ambient radiation, leading to a coating of a solid polymer on the vessel, which may inhibit subsequent use of the vessel.

The inventors have recognized and appreciated that there are benefits to using a single storage unit for both storage of a resin material and for containing the resin material during additive fabrication. With such a configuration, it may be unnecessary to transfer resin material from the storage unit, leading to reduction of unintentional exposure and leading to easier use of the resin since the resin need not be poured from the storage unit into another vessel for fabrication.

In order that a single storage unit be used both for storage and during additive fabrication, it is desirable that the unit may be configured to be actinically opaque during storage yet include at least one actinically transparent region through which actinic radiation may be directed (e.g., to resin within the container) during additive fabrication. The inventors have recognized and appreciated that a storage unit may be configured in such a way by arranging an actinically transparent region of the unit such that during storage (which may include placing of a storage unit onto a surface and/or stacking of storage units) the actinically transparent region of the unit is substantially shielded from actinic radiation due to natural placement of the unit for storage.

According to some embodiments, the storage unit may include a region that is transparent to actinic radiation such that the storage unit may be used in stereolithographic processes in which actinic radiation is supplied to the resin within the storage unit through that surface. The remainder of the storage unit may be opaque to actinic radiation, and may include a removable lid that may be removed when the storage unit is installed within an additive fabrication device. Accordingly, the storage unit may be stored with the lid attached and also used without the lid directly as a component of an additive fabrication device. As such, it may become unnecessary to remove the resin from the storage container.

According to some embodiments, the storage unit is shaped such that the actinically transparent region is covered by a table or other surface during storage of the resin (i.e., at times when additive fabrication is not being performed). As such, the resin inside the storage unit may be substantially shielded from sources of actinic radiation exterior to the storage unit. When the storage unit is used as a component of an additive fabrication device, the shielding surface is not present, and the actinically transparent region may be used to direct actinic radiation to resin located within the unit. Accordingly, a single storage unit may inhibit exposure of a resin to actinic radiation during storage using a combination of actinically opaque material and surfaces adjacent to the unit during storage, yet may allow actinic radiation to pass through the actinically transparent portion of the storage unit during additive fabrication.

According to some embodiments, a storage unit may include a removable lid. The lid may be opaque to actinic radiation and may be configured to be attached to a remainder of the storage unit when the storage unit is used for storage of resin, and may be configured to be removed from the storage unit when the storage unit is installed within an additive fabrication device. The lid may be shaped so as to allow multiple storage units to be stacked on top of one another. For instance, the lid may include one or more portions shaped to mate with respective portions of a bottom side of a storage unit. The lid may also include one or more locking mechanisms configured to provide a seal or other tight fit between the lid and the remainder of the storage unit. In some cases, such a locking mechanism may include a portion on the lid and a portion on the remainder of the storage unit such that the two portions may mate and/or lock together to hold the lid in place.

According to some embodiments, one or more portions of a bottom side of a storage unit that are actinically transparent may be shaped to mate with respective portions of a lid of the storage unit. In such a configuration, mating the two storage units via the respective portions may cause the portions of the lid to block actinic radiation that would otherwise pass through the actinically transparent portions of the bottom side of the storage unit. In this way, the storage units may be designed to stack in order to make the stack of storage units collectively actinically opaque, or to at least reduce the number of regions of the collection of storage units that are exposed to actinic radiation. For instance, storage units that are stackable as described above and that include an actinically transparent region on a bottom surface may be stacked such that the only actinically transparent region not covered by another storage unit is on the underside of the bottom storage unit of the stack.

In general, incidence of actinic radiation upon a photopolymer material can have various effects. For instance, actinic radiation may cure the material, at least in part (e.g., it may harden the material to some extent). Alternatively, the actinic radiation may have no measurable effect on the material. Which effect(s) occur when a photopolymer is exposed to actinic radiation may depend, at least in part, on the wavelength(s) of radiation exhibited by the actinic radiation and/or the amplitude of the radiation at one or more of the wavelengths. For instance, since a given photopolymer may react to a particular wavelength, or wavelengths, of radiation, the effect of actinic radiation incident upon the photopolymer may depend upon which of the wavelengths, if any, are present in the actinic radiation.

In some embodiments, an actinically opaque material substantially attenuates (e.g., reduces the amplitude by 50-100%) the amplitude of at least one wavelength of radiation passing through the material (e.g., 405 nm wavelength light), wherein the at least one wavelength is associated with curing of at least one photopolymer. It may be the case that the same actinically opaque material does not substantially attenuate (though may attenuate to some degree) other wavelengths that could be used to cure a different photopolymer. Thus, in some embodiments, a material may be considered actinically opaque if the material is configured to substantially attenuate the transmission of at least one wavelength that is capable of curing a particular photopolymer, or particular photopolymers (though may not substantially attenuate other wavelengths that are capable of curing a different photopolymer). In some embodiments, an actinically transparent material does not substantially attenuate (e.g., reduces the amplitude by less than 50%) the amplitude of at least one wavelength of radiation passing through the material (e.g., 405 nm wavelength light), wherein the at least one wavelength is associated with curing of at least one photopolymer.

In some embodiments, an actinically opaque material substantially attenuates (e.g., reduces the amplitude by 50-100%) the amplitude of at least one wavelength of radiation passing through the material, wherein the at least one wavelength is associated with curing a class of photopolymers. Photopolymers that share particular chemical characteristics often have similar responses to similar radiation (e.g., similar amplitude and/or wavelengths) and, in some embodiments, a material may be considered actinically opaque if the material is configured to substantially attenuate the transmission of at least one wavelength that is capable of curing any of a class of photopolymers. The same wavelengths may, or may not, be capable of curing photopolymers that are not members of the class. In some embodiments, an actinically transparent material does not substantially attenuate (e.g., reduces the amplitude by less than 50%) the amplitude of at least one wavelength of radiation passing through the material, wherein the at least one wavelength is associated with curing of a class of photopolymers.

In some embodiments, substantial attenuation of radiation by a material comprises reducing the amplitude of the radiation by between 70% and 100%. In some embodiments, substantial attenuation of radiation by a material comprises reducing the amplitude of the radiation by between 90% and 100%. In some embodiments, substantial attenuation of radiation by a material comprises reducing the amplitude of the radiation by between 95% and 100%.

In some embodiments, a material does not substantially attenuate radiation if the material reduces the amplitude of the radiation by between 0% and 50%. In some embodiments, a material does not substantially attenuate radiation if the material reduces the amplitude of the radiation by between 0% and 30%. In some embodiments, a material does not substantially attenuate radiation if the material reduces the amplitude of the radiation by between 0% and 10%.

Following below are more detailed descriptions of various concepts related to, and embodiments of, systems and methods storing photopolymers used in additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

One illustrative additive manufacturing technology considered herein is stereolithography, such as used by the Form 1 3D Printer sold by Formlabs, Inc., the assignee of the present application. The Form 1 system is described more fully in one or more of U.S. patent application Ser. No. 14/245,765, filed Apr. 4, 2014 and titled "Additive Fabrication Support Structures"; U.S. patent application Ser. No. 13/848,979, filed Mar. 22, 2013 and titled "3D Printer with Self-Leveling Platform"; and U.S. Patent Application Ser. No. 61/808,714, filed Apr. 5, 2013 and titled "Three-Dimensional Printing with Customizable Support Structures," the disclosures of which are incorporated by reference herein in their entireties. Although the embodiments described herein are primarily disclosed with respect to the Form 1 and stereolithography, it may be appreciated that the invention may also be applicable to other systems, including additive fabrication technologies that form objects using material sensitive to actinic radiation, including but not limited to liquid resin.

Figure 1:
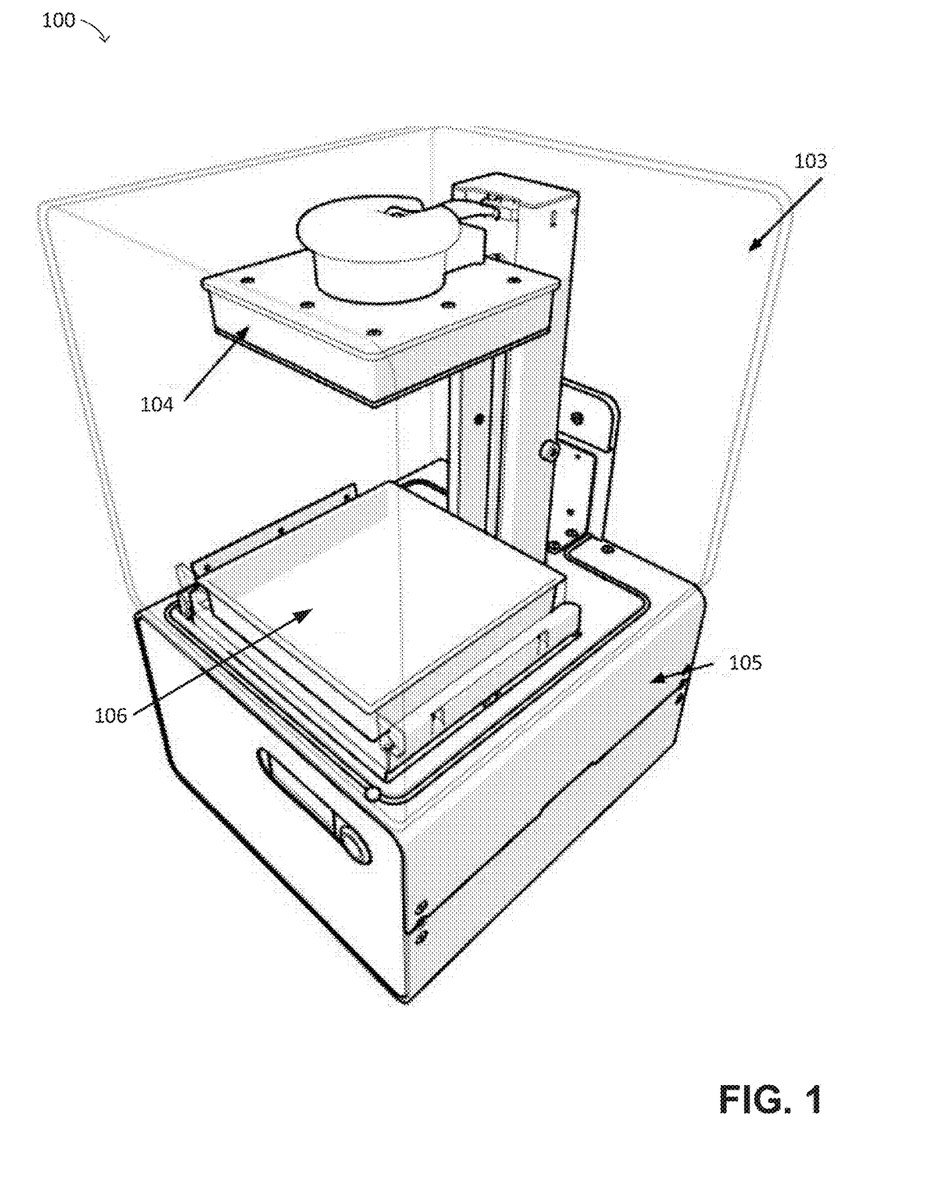
FIG. 1 depicts an illustrative stereolithography system, according to some embodiments.

FIG. 1 depicts an illustrative stereolithography system, according to some embodiments. System 100 includes a base housing 105 containing various mechanical, optical, electrical, and electronic components that operate the system. An upper housing 103 is substantially opaque to actinic radiation frequencies used within the system for hardening of liquid resin. The upper housing 103 protects the build platform 104 and an inserted resin container 106, from unwanted exposure from actinic radiation. The upper housing may, or may not, be transparent to other radiation frequencies.

Figure 2:
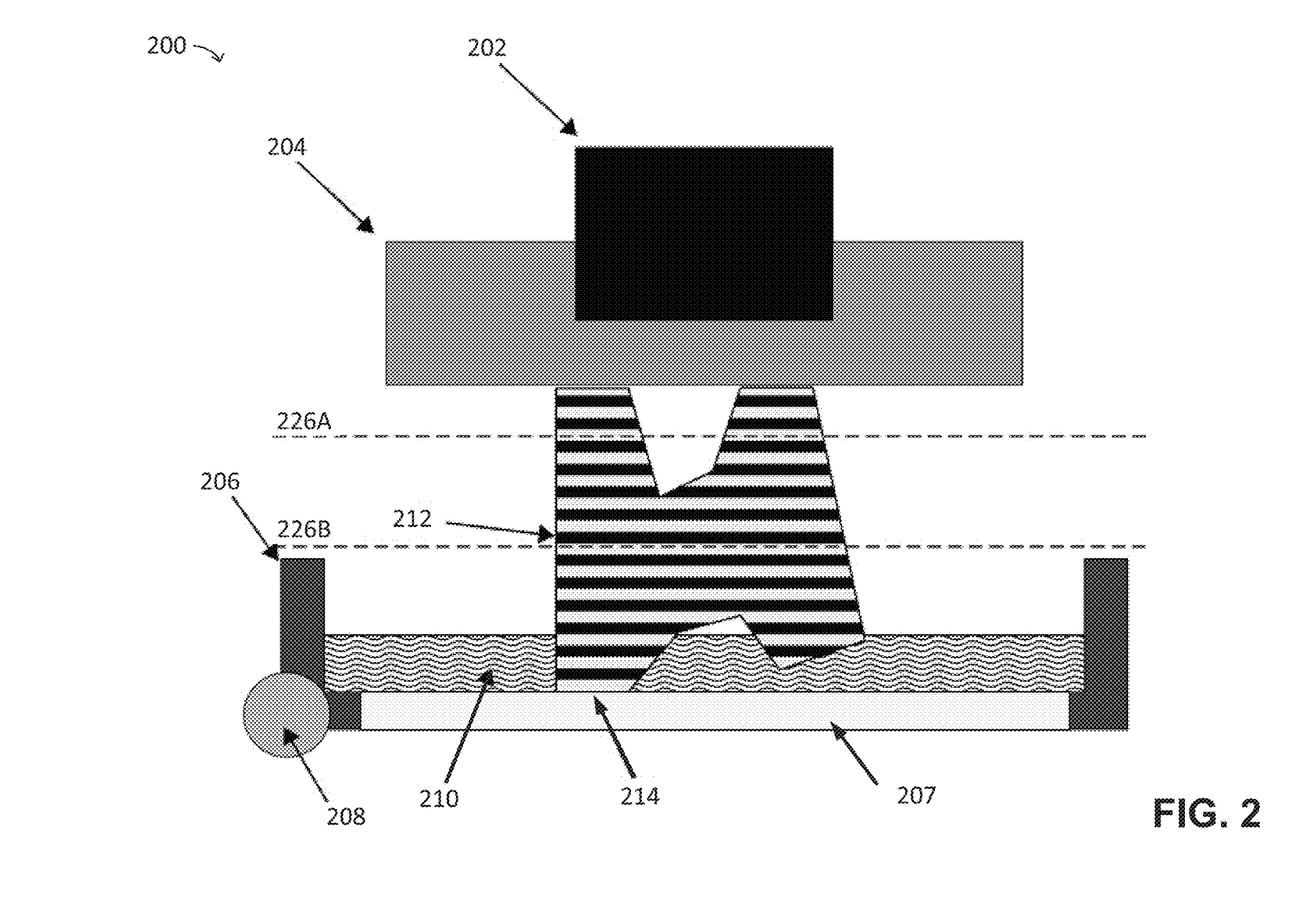
FIG. 2 depicts a cross-section of an illustrative stereolithography system during fabrication of a part, according to some embodiments.

During additive fabrication, the resin container 106 may be filled with a photopolymer resin. FIG. 2 depicts a cross-section of an additive fabrication such as system 100 during fabrication of a part 212. In the example of FIG. 2, a downward facing build platform 204 directly opposes the floor of the resin container 206 filled with a photopolymer resin 210. The part being fabricated 212 is formed layerwise with the initial layer attached to the build platform 204.

A region 207 of the resin container's floor is transparent to actinic radiation, which allows portions of the thin layer of liquid photocurable resin resting on the floor 214 to be targeted by the radiation through the transparent portion. Exposure to actinic radiation cures a thin layer of liquid resin which causes it to harden between the two surfaces to which it is adjacent (the base of container 206 and a previously formed layer of part 212).

The top side of the cured resin layer typically bonds to the bottom surface of the build platform 204 or with the previously cured resin layer, as well as to the transparent floor of the container 214. The bond of the cured resin with the transparent floor of the container is undesirable, and is typically broken so that additional layers may be formed. In an illustrative implementation, such as the Form 1 3D printer distributed by Formlabs Inc., depicted in FIG. 1, a separating force is applied when the bottom of the resin container 206 is mechanically separated, or "peeled," from the part 212 by pivoting the container 206 about a fixed axis 208 on one side of the container. This peeling step involves moving the resin container 206 away from the part 212 followed by a move of the resin container 206 back towards the part 212. Following this motion, a new layer of liquid resin is available for exposure and addition to the part being formed. Each step of the aforementioned curing and peeling processes may continue until the part is fully created.

Some resin containers, unlike resin container 106 depicted in FIG. 1 and resin container 206 depicted in FIG. 2, may be made of a single actinically transparent material. This material may have been chosen to allow for actinic radiation to pass through the lower portion of the resin container (e.g. without substantial attenuation) to initiate curing of liquid resin. Such designs, however, may also allow unwanted actinic radiation from the environment or other sources to penetrate the resin container and potentially expose the resin to the radiation. Accordingly, when using such containers the resin is typically transferred to an actinically opaque container during storage of the resin. As discussed above, however, this may lead to additional problems such as curing of resin that adheres to the surfaces, etc.

Figure 3:
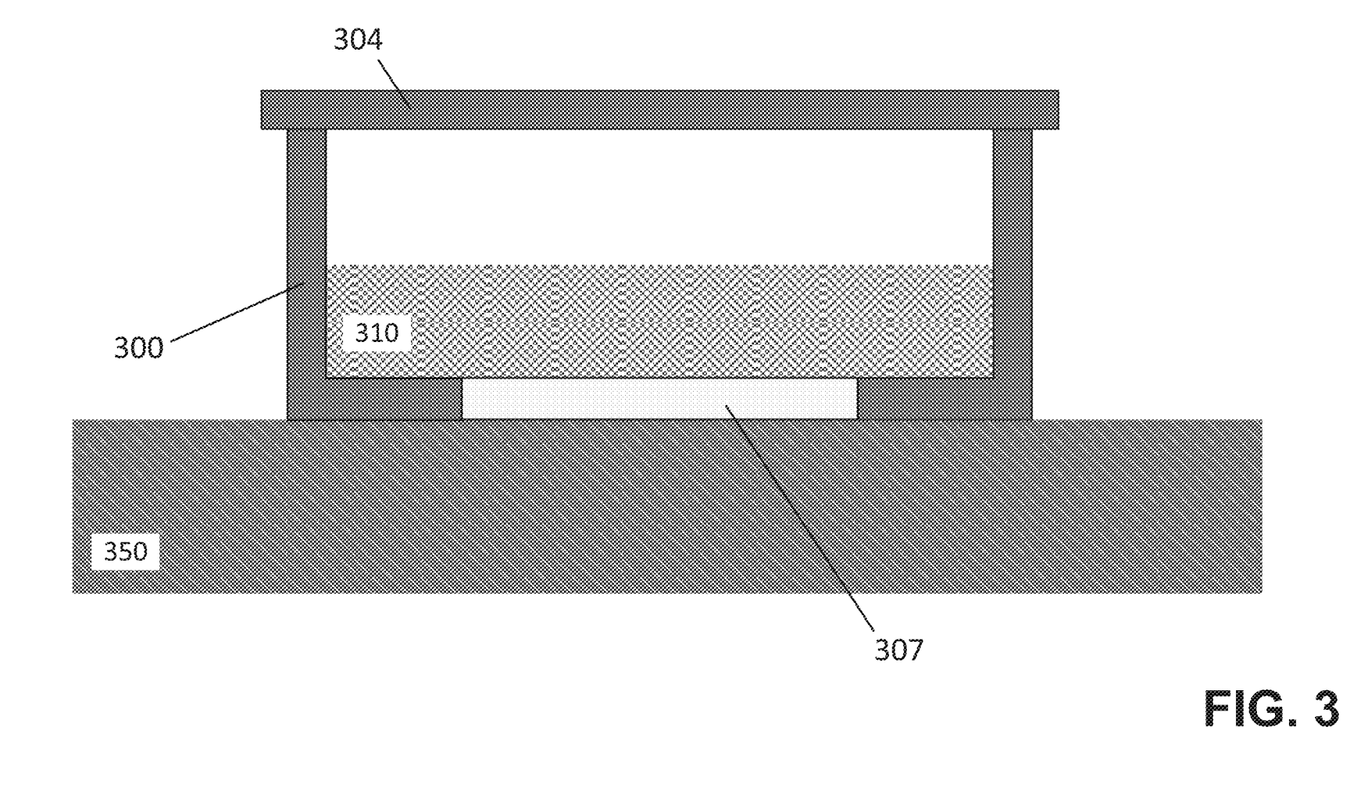
FIG. 3 depicts a cross-section of an illustrative storage unit storing a photopolymer resin, according to some embodiments.

The illustrative storage unit depicted in FIG. 3 addresses these issues by providing a single storage unit that may be used during additive fabrication and during storage. In the example of FIG. 3, storage unit 300 sits on a surface 350, which may be a table, shelf, or other suitable surface commonly used for storage, and which is actinically opaque. The storage unit includes a removable lid 304 and a region that is actinically transparent 307. The remainder of the storage unit (other than region 307) is actinically opaque. The storage unit comprises a liquid resin 310.

In the example of FIG. 3, by placing the storage unit 300 on surface 350, the resin 310 is surrounded by actinically opaque material. While there is an actinically transparent region 307 of the storage unit, actinic radiation originating outside of the storage unit is substantially blocked from reaching the resin due to the storage unit being placed on the surface 350, which is actinically opaque. Multiple of storage units 300 may be placed on top of one another such that the collection of storage units is actinically opaque (since the actinically transparent region of each storage unit will be adjacent to the actinically opaque lid of the storage unit on which it rests).

Figure 4:
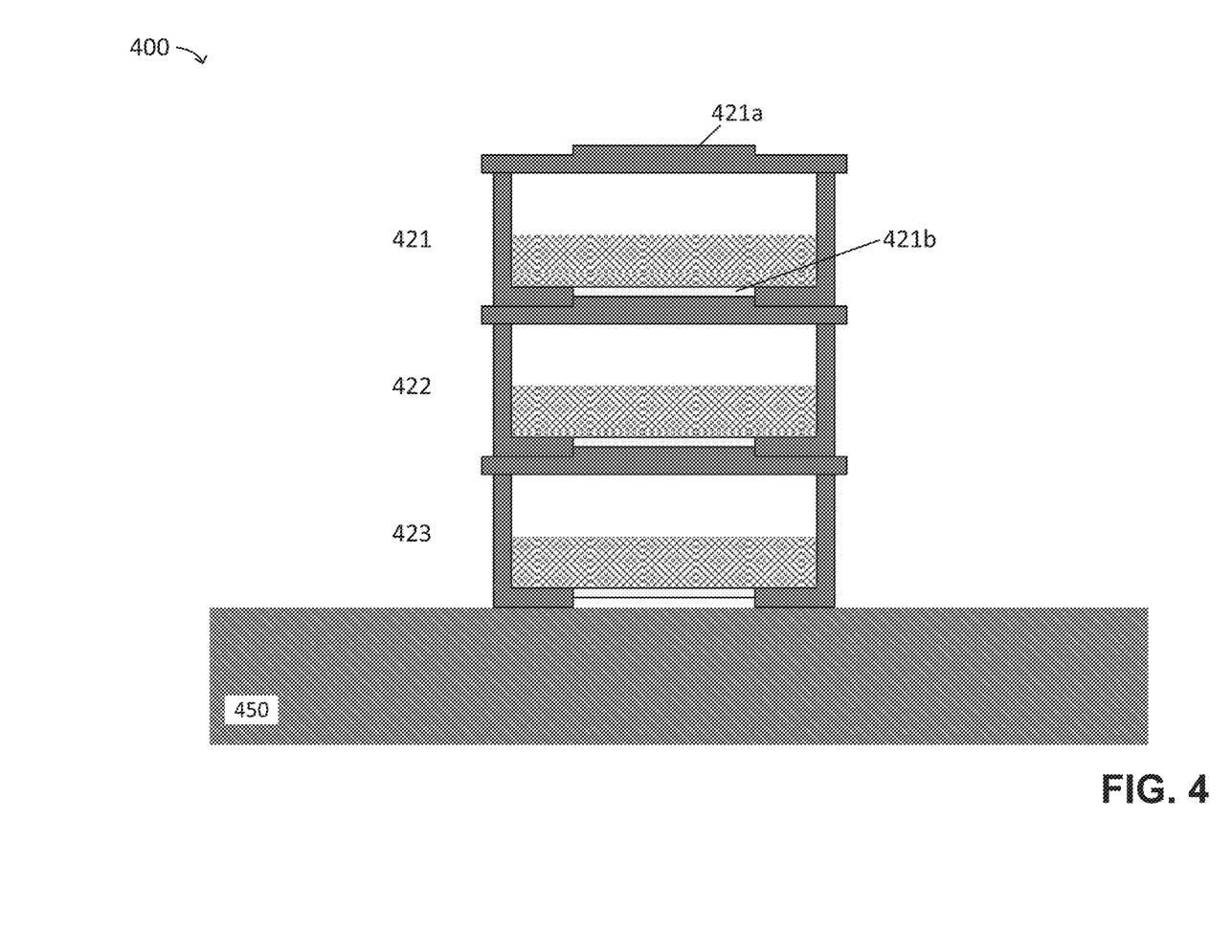
FIG. 4 depicts stacked storage units each storing photopolymer resin, according to some embodiments.

FIG. 4 depicts stacked storage units each storing photopolymer resin, according to some embodiments. The storage units 421, 422 and 423 shown in the example of FIG. 4 each include a raised portion in their lid (of which lid 421a is one example) and a recessed portion in their bottom face that is actinically transparent (of which portion 421b is one example). The recessed portions may mate with the raised portions such that the lids stack together. The collection of storage units 421, 422 and 423 is collectively actinically opaque since each actinically transparent region is adjacent to an actinically opaque lid (in the case of the regions of storage units 421 and 422) or is adjacent to surface 450 (in the case of the region of storage unit 423).

Accordingly, one advantage of the present invention is that embodiments may not only be effectively used as resin containers within a stereolithographic device during the operation and formation of a part but also be effectively used as a storage unit for photopolymer resin when it is kept outside of the stereolithographic device. As described above, actinically opaque portions of the storage unit may serve to shield the contents of the resin container from unwanted environmental actinic radiation that might otherwise enter through the sides or other regions of the container. While the bottom of the container remains actinically transparent, the inventors have observed that resin containers are typically stored on a flat surface, such as the top of a table or desk. As will be appreciated, such surfaces are, typically, themselves opaque to relevant frequencies of actinic radiation. As a result, no actinic radiation (or a negligible quantity of actinic radiation) may enter the resin container through the actinically transparent window. When used as a storage container, a resin container according to embodiments of the preferred invention can therefore be substantially isolated from environmental actinic radiation by covering the top opening of the resin container, such as with a lid made of an actinically opaque material.

Figure 5A:
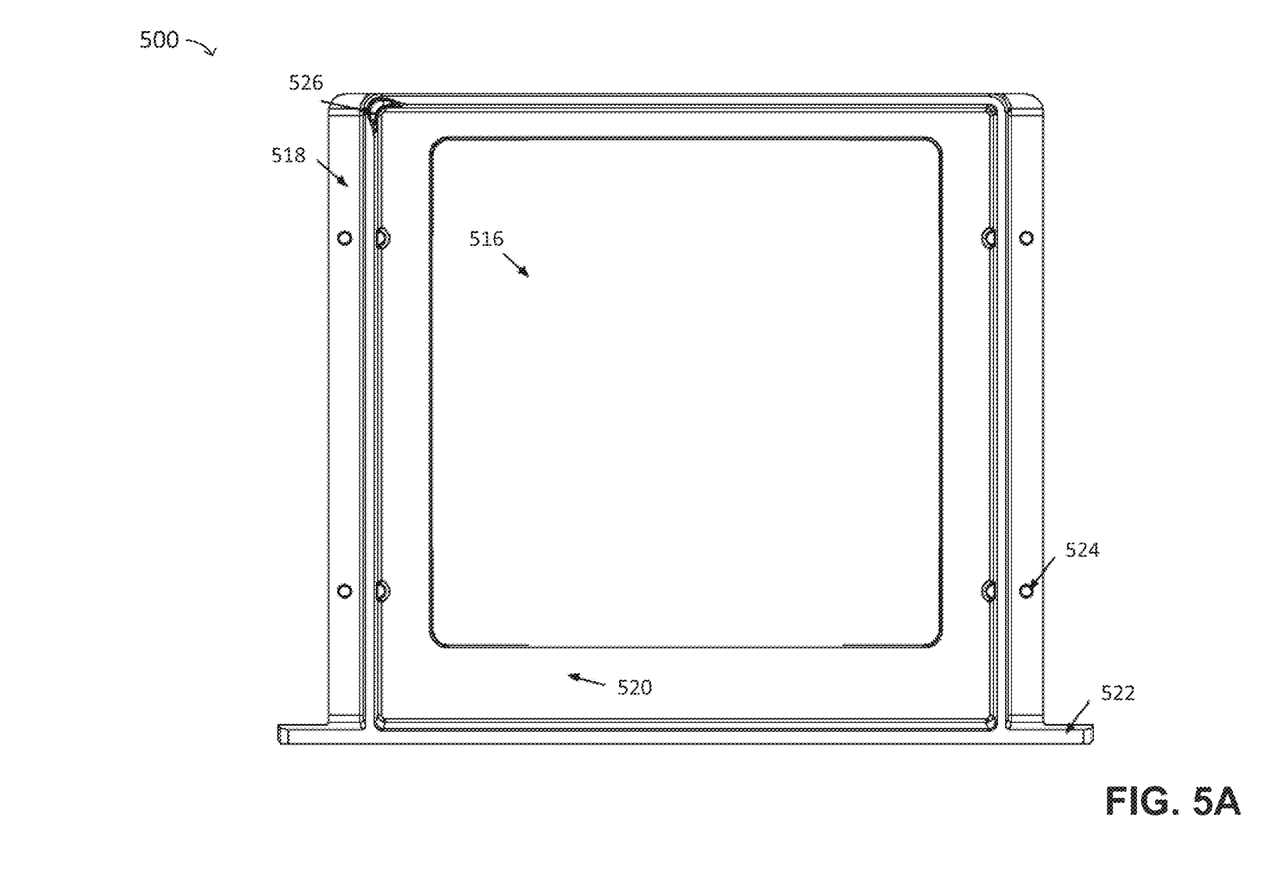
FIGS. 5A-5C depict an illustrative container for storing photopolymer resin, according to some embodiments.
Figure 5B:
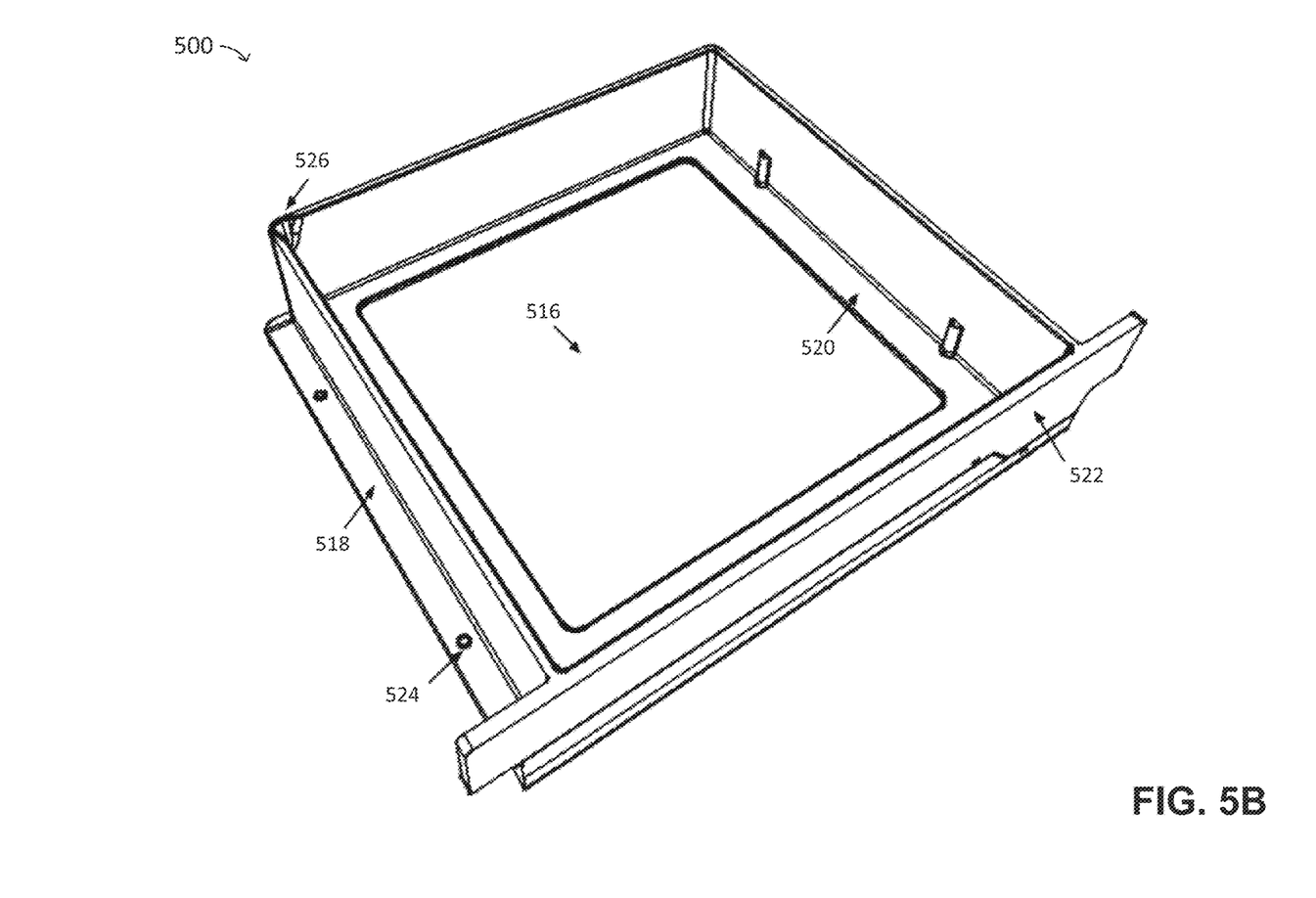
Figure 5C:
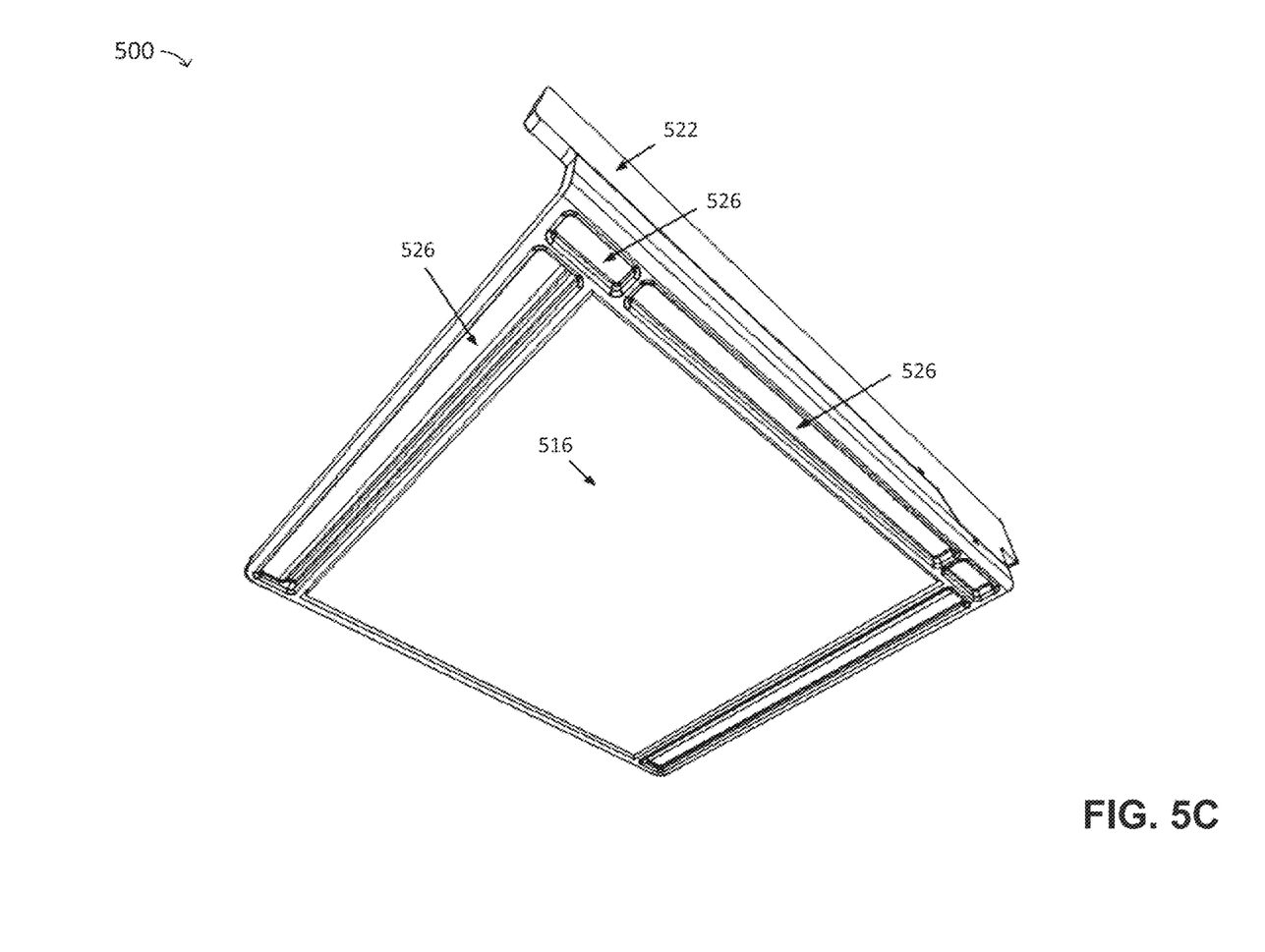

FIGS. 5A-5C depict an illustrative container for storing photopolymer resin, according to some embodiments. In the example of FIGS. 5A-5C, an actinically transparent window 516 of container 500 allows for transmission of actinic radiation. The window is located within an actinically opaque container frame 520 that blocks a substantial amount of actinic radiation from passing through the frame 520. By virtue of the actinically transparent window 516, photopolymer resin within the resin container may be intentionally exposed to actinic radiation at the bottom layer of the resin container. For instance, container 500 may be used as container 106 shown in FIG. 1 and/or may be used as container 206 shown in FIG. 2 wherein actinic radiation is directed through the window 516 to resin located within the container.

In the example of FIGS. 5A-5C, a recessed area 526 is integrated into the resin container frame 518 thereby forming a spout that may allow for easy removal of resin from the resin container. For instance, the spout 526 may provide reduced spillage compared with comparable pouring from container 500 than would occur without such a spout. In addition, recessed points 524 and stopping features 522 may be formed within the resin container in order to assist with the alignment of container 500 within a stereolithographic device.

The actinically transparent window 516 may be located at a height above the lowest point of the resin container frame 520 so as to avoid damage, such as scratches or contamination, to the window potentially caused by placing the resin container on a flat surface, such as a table or shelf. The inventors have found that even minor offsets (for example, offsets between 0.1 mm and 1.0 mm) of the actinically transparent window above the lowest level of the resin container may substantially reduce the risk of such damage or contamination. Such minor offsets of the actinically transparent window may also help to ensure that actinic radiation is blocked from entering through the actinically transparent window when the resin container frame 520 is placed on an actinically opaque surface for storage. In addition, differential coloration of the actinically opaque resin frame and the actinically transparent window may advantageously demarcate the window region so as to assist users in keeping said window region protected from debris or contamination, such as fingerprints. Such differential coloration can be advantageously provided by the same techniques and treatments used to render the resin container frame actinically opaque.

Figure 6A:
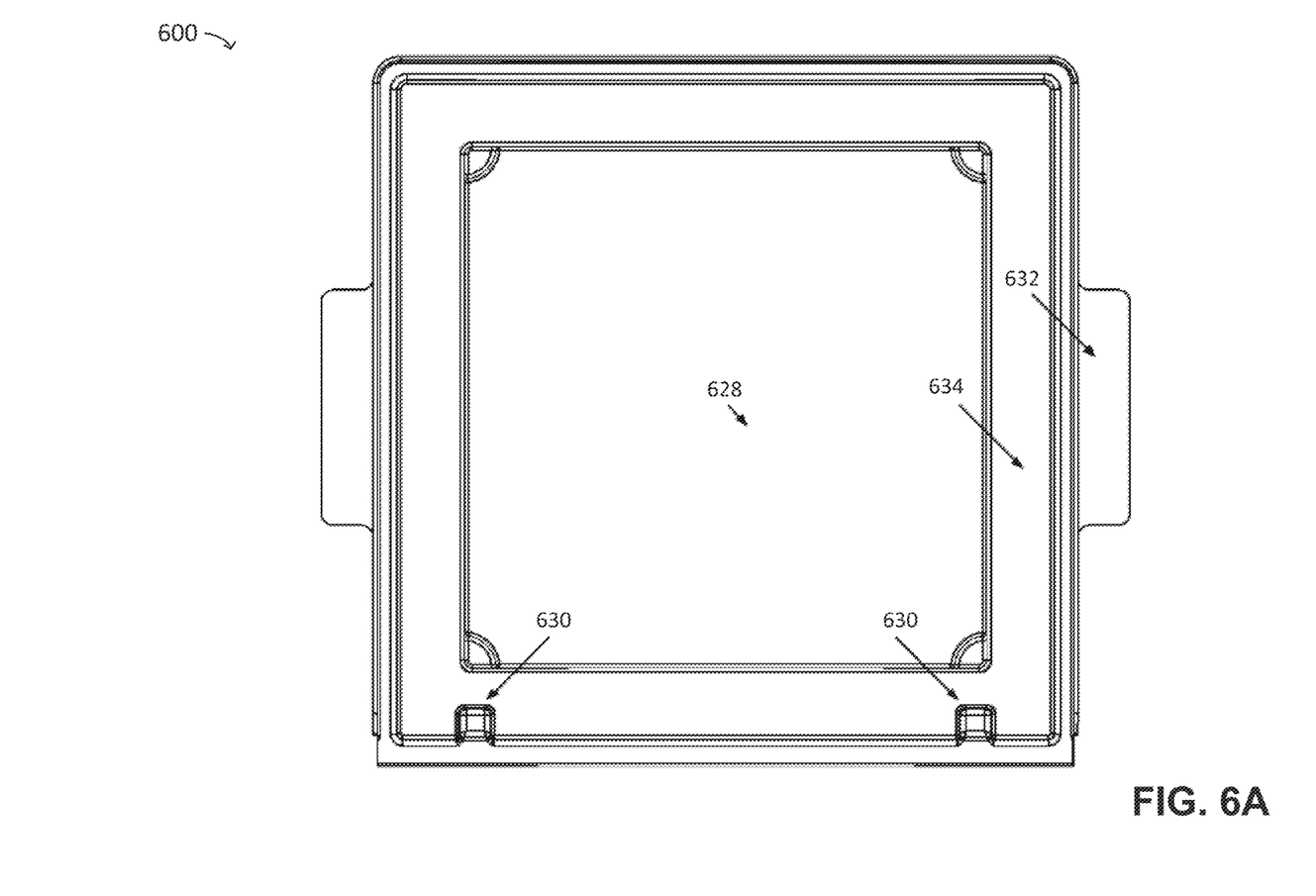
FIGS. 6A-6C depict an illustrative storage unit lid, according to some embodiments.
Figure 6B:
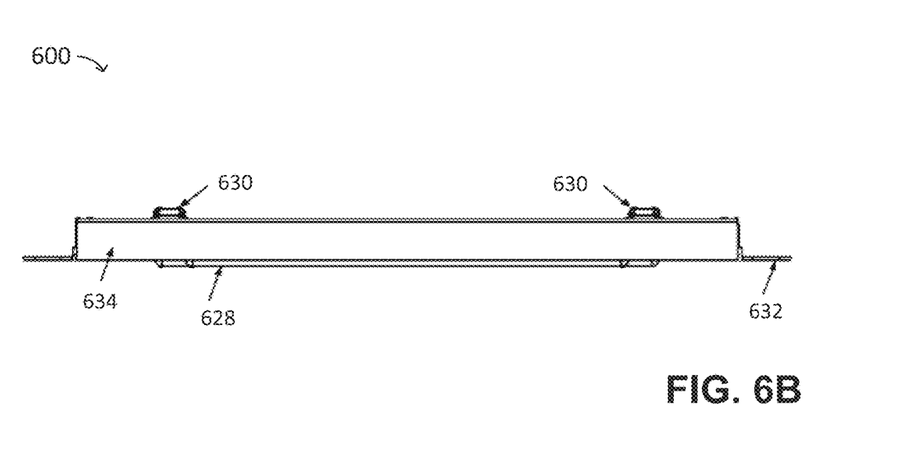
Figure 6C:
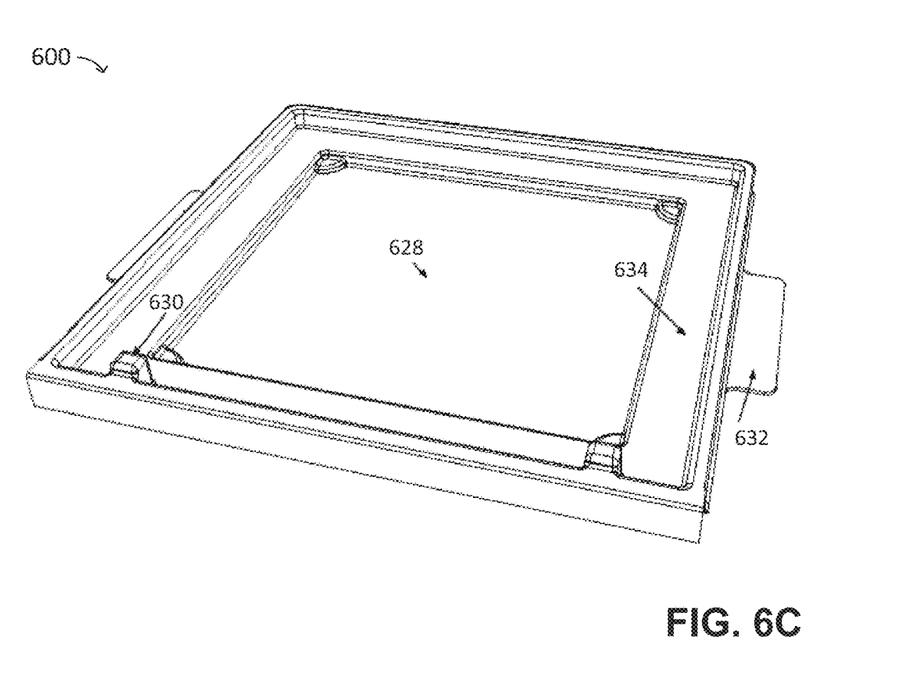

FIGS. 6A-6C depict an illustrative storage unit lid, according to some embodiments. Lid 600 may be removably attached to any suitable storage container, such as container 500 shown in FIGS. 5A-5C. As with the example of FIG. 4, a top recess 628 on lid 600 may provide clearance between the lid and an actinically transparent window in the resin container immediately above it (not shown). A raised portion 634 of the lid may provide a secure surface on which the resin container immediately above the lid may rest. The top recess 628 may further advantageously provide a recess wherein a build platform may be placed when not in use. In the example of FIGS. 6A-6C, tabs 632 may be folded down over the sides of a container (e.g., container 500) to improve the fit between lid and resin container. For instance, the tabs may snap or otherwise lock into position to provide an actinically opaque seal between the lid 600 and a container such as container 500.

Storage containers and/or storage units as described above may be formed in any suitable way. According to some embodiments, a storage container comprising an actinically transparent window and an actinically opaque frame may be formed by assembling two or more components made from materials with desired optical properties. In some implementations, materials such as poly-methyl methacrylate (commonly known commercially as "Plexiglas" or "ACRY-LITE"), or other acrylics, may be used. In some formulations, poly-methyl methacrylate material may be produced to be substantially transparent to actinic radiation, while other formulations yield poly-methyl methacrylate material substantially opaque to actinic radiation, such as is commercially available as ACRYPET VH-067A from Mitsubishi Rayon Polymer Nantong Co., Ltd.

According to some embodiments, a storage container may be composed of a single material transparent to actinic radiation with regions of the container coated so as to render the container frame actinically opaque. It may be advantageous that the actinically opaque frame of the resin container remain at least partially transparent to certain portions of the visible spectrum so as to allow the user to observe the status of the photopolymer resin, including the amount of remaining photopolymer resin, as well as the status of part formation within the resin container during operation.

Figure 7:
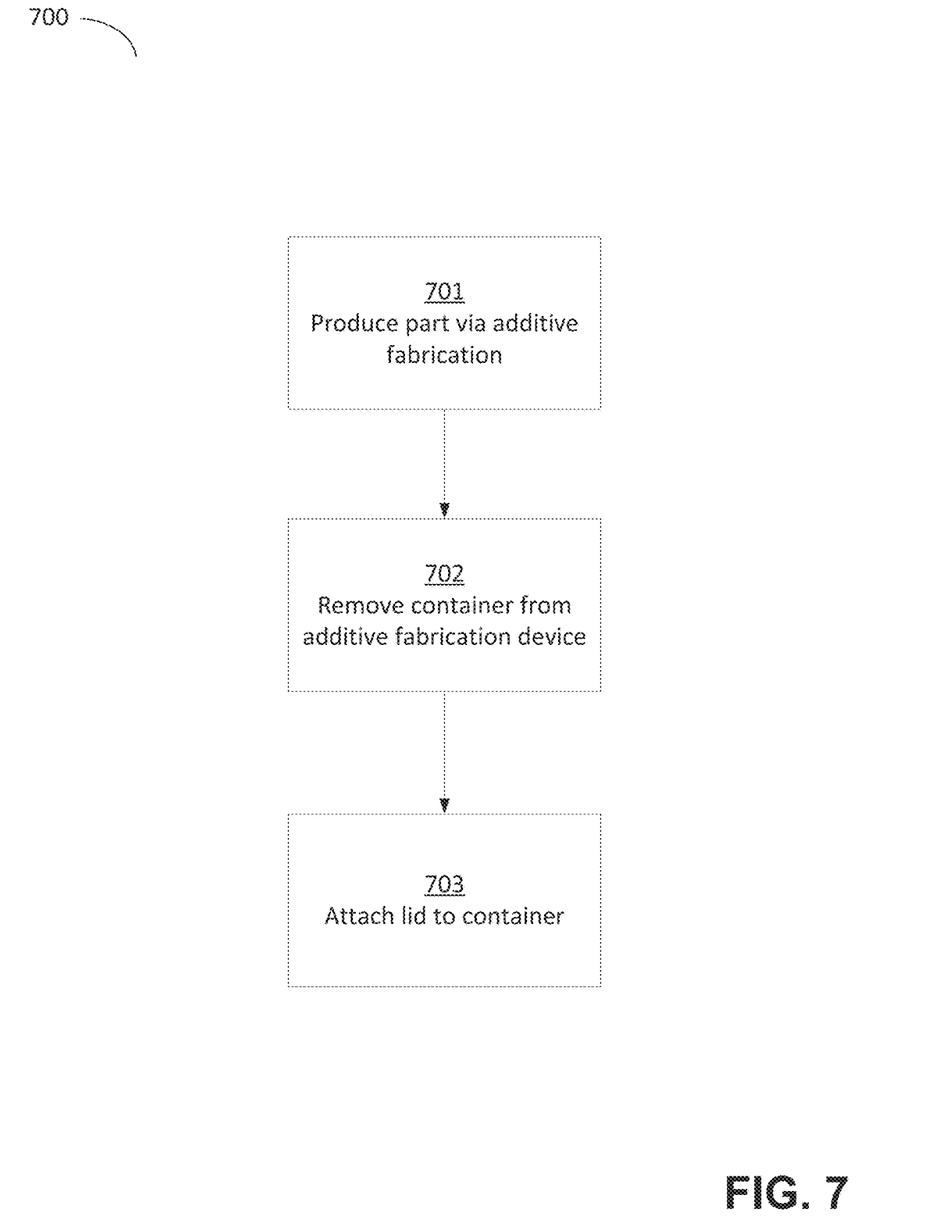
FIG. 7 depicts a method of storing photopolymer resin used in additive fabrication, according to some embodiments.

FIG. 7 depicts a method of storing photopolymer resin used in additive fabrication, according to some embodiments. Method 700 begins in act 701 in which a part is produced via additive fabrication. Act 701 may comprise use of any suitable additive fabrication device to produce the part, and may use any one or more additive fabrication techniques. According to some embodiments, the part is produced in act 701 via stereolithography.

Irrespective of which additive fabrication technique(s) are used, the additive fabrication device in method 700 includes, as a component, a container in which material used in the additive fabrication process of act 701 is stored. In act 702, the container is remove from the additive fabrication device used in act 701, and in act 703 a lid is attached (e.g., removably attached) to the container. In method 700, the container may include actinically transparent regions in addition to actinically opaque regions. For instance, the container of method 700 may include container 300 shown in FIG. 3, container 421, 422 and/or 423 shown in FIG. 4 and/or container 500 shown in FIGS. 5A-5C. The lid may be actinically opaque. For instance, the lid of method 700 may include lid 304 shown in FIG. 3, lid 421*a* shown in FIG. 4, and/or lid 600 shown in FIGS. 6A-6C.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A photopolymer storage unit, comprising:
   a bottom face including a bottom surface and an actinically transparent surface recessed toward an interior of the photopolymer storage unit relative to the bottom surface;
   at least one wall extending upwards from said bottom face,
   wherein the photopolymer storage unit is configured to removably attach to an additive fabrication device.

2. The photopolymer storage unit of claim 1, wherein the at least one wall includes a spout.

3. The photopolymer storage unit of claim 1, further comprising one or more stopping features configured to limit motion of the photopolymer storage unit during attachment of the photopolymer storage unit to the additive fabrication device.

4. The photopolymer storage unit of claim 1, wherein the bottom surface and the at least one wall are actinically opaque.

5. The photopolymer storage unit of claim 4, wherein the bottom surface and the at least one wall are opaque to at least a first wavelength of light and wherein the actinically transparent surface is transparent to at least the first wavelength of light.

6. The photopolymer storage unit of claim 1, further comprising a lid configured to be removably attached to the at least one wall.

7. The photopolymer storage unit of claim 6, wherein the lid comprises a plurality of tabs adapted to be actuated to create a locking engagement between the lid and the at least one wall.

8. The photopolymer storage unit of claim 6, wherein the lid includes a raised portion configured to mate with the bottom face of a second photopolymer storage unit.

* * * * *